United States Patent [19]
Chaput

[11] 3,779,101
[45] Dec. 18, 1973

[54] POCKETED GEAR DIFFERENTIAL
[75] Inventor: Victor B. Chaput, Nashua, N.H.
[73] Assignee: Alex Simoneau, Nashua, N.H.
[22] Filed: May 11, 1972
[21] Appl. No.: 252,302

[52] U.S. Cl. ............................ 74/711, 184/6.12
[51] Int. Cl. ..................... F16h 1/44, F01m 9/10
[58] Field of Search ............... 74/711, 710.5, 467, 74/468; 184/6.12; 192/61

[56] References Cited
UNITED STATES PATENTS

| 2,775,141 | 12/1956 | Ronning | 74/711 |
| 2,675,098 | 4/1954 | Cole | 74/467 X |
| 2,869,399 | 1/1959 | Miles | 74/711 |
| 3,420,120 | 1/1969 | Burtner | 74/711 |
| 2,539,423 | 1/1951 | Howard | 184/6.12 X |

Primary Examiner—Arthur I. McKeon
Attorney—Richard I. Seligman

[57] ABSTRACT

A pocketed gear differential has conventional side gears modified with a plate connectd to the toe and a sleeve arranged about the heel thereof whereby a pocket is formed so that a lubricant entrapped within the meshing gears of the differential cannot readily escape from the sides of the meshing gears and is available to resist rapid movement of the gears to provide a limited slip action.

11 Claims, 8 Drawing Figures

POCKETED GEAR DIFFERENTIAL

BACKGROUND OF THE INVENTION

Automobiles and other automotive vehicles are driven through differentials which permit one driven wheel to rotate faster than the other driven wheel without strain when turning or when traction is reduced at one of the driven wheels. The differential supplies equal torque to both wheels.

A problem can arise where the supplying of an equal torque to both driven wheels is detrimental to operation of the vehicle. For example, if one of two driven wheels loses its traction, which often occurs when driving on a slippery surface such as ice, mud, snow or the like, the other wheel will lose torque in proportion to the amount of traction lost in the one wheel. This will cause the wheel which loses its traction to spin while the wheel on solid ground remains motionless as, of course, does the vehicle.

The locking-type differential was developed to eliminate this problem by locking both output shafts together when high engine power is applied. Therefore, if one wheel loses its traction the other wheel will not lose its torque. Thus, an automotive vehicle with one wheel on a slippery surface and another on a relatively dry surface can still move forward.

A major problem with the locking-type differential is that when high engine power is applied, thus locking both output shafts, "fish-tailing" or "side-slipping" of the vehicle can occur on slippery surfaces. Also, accelerating while turning corners can become a problem since both output shafts lock causing the inner power wheel to turn at the same speed as the outer wheel. This results in excessive tire wear and, more important, a significant loss of control of the vehicle. Skidding of the inner wheel may cause eratic turns or even prevent the auto from making the turn at all. Furthermore, the locking-type differentials are expensive, require frequent maintenance and are subject to failure.

U.S. Pat. No. 3,420,120 describes a differential having a dilitant material such as silicone putty among the differential gears which permits the desirable differential action under normal conditions where relative differences in loads and speeds of the output shafts are small, while hopefully preventing the transfer of all of the driving torque to one shaft in response to a substantial loss of load on that shaft. Silicone putty exhibits a high resistance to flow under sudden application of pressure, but flows under a slow application of pressure. Thus, when silicone putty is placed among the differential gears there is little effect therefrom during normal driving since there is relatively little difference in speed between the output shafts even when turning. However, when the differential gears tend to rotate at a substantial speed relative to the gears on the output shafts, the silicone putty applies a load that resists fast movement of the differential gears, thereby limiting the differential action and causing torque to be applied to both output shafts.

The drawback to that disclosed in said U.S. Pat. No. 3,420,120 is that the silicone putty has free escape from the sides of the meshing gears, and, thus, there is less material available to resist the speed of the gears. Attempts to remedy this problem are not satisfactory in that they are relatively expensive, require that major modifications be made to normal differentials, are relatively complex and decrease the reliability of the simple approach set forth in said U.S. Pat. No. 3,420,120.

SUMMARY OF THE INVENTION

Accordingly, it is an object of this invention to provide an improved differential.

It is another object of this invention to provide an improved differential which is economical, relatively free from maintenance and reliable.

It is a further object of this invention to provide a differential which will permit the application of torque to one wheel while another has lost traction and yet not lock both output shafts.

Briefly, an improved differential is provided by substituting pocketed side gears for the conventional side gears at the inner ends of the driven shafts of a conventional differential, filling the differential housing with a high viscosity fluid, preferably, silicone putty, and sealing the differential housing. Pocketed gears which are formed by providing a plate at the toe of a conventional side gear and a modified truncated cone sleeve at the heel thereof, permit the retention of fluid within the gear teeth spaces when the pocketed gear is meshed with differential pinions. Since fluid cannot readily escape from the pocketed gear, the teeth of the pinion will face greater resistance in displacing the fluid from the pocket into which they enter.

BRIEF DESCRIPTION OF THE DRAWINGS

The above-mentioned and other features and objects of the invention will become more apparent by reference to the following description taken in conjunction with the accompanying drawings, in which.

DESCRIPTION OF PREFERRED EMBODIMENTS

Figure 1:
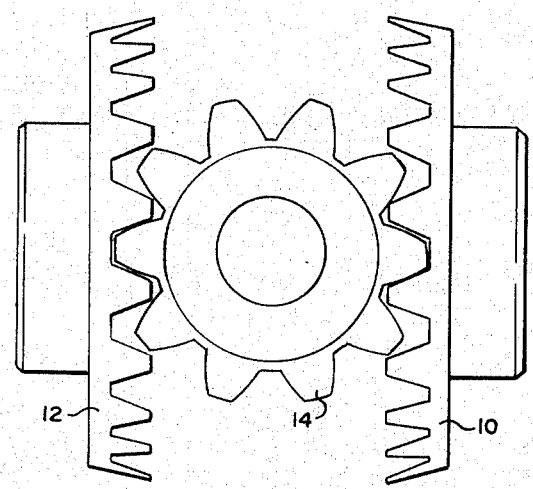
FIG. 1 is a pictorial representation of a portion of a conventional differential gearing.

Referring now to FIG. 1, there is illustrated thereby a portion of a conventional differential gearing arrangement comprising a pair of side gears 10 and 12 and a number of differential pinion gears only one 14 being shown. The output shafts (not shown) would be connected to side gears 10, 12 in the usual manner. The remainder of the differential has been omitted for clarity as it is well known to those skilled in the art. In the system described in said U.S. Pat. No. 3,420,120 the differential casing is filled with "Bouncing Putty" and the casing is sealed to prevent flow of the "Bouncing Putty" from the casing. As will be apparent from viewing FIG. 1, as any tooth of gear 14 enters the space between two teeth of gear 10 or 12 the material (for example, silicone putty) will be forced out of the space offering resistance in proportion to the speed at which the tooth enters the pocket. However, the displaced silicone putty will be squeezed in part out of the sides of the gear into the housing and not into the space from whence the tooth came and, thus, lessing the amount of silicone putty available to resist the speed of the differential pinions.

Figure 2:
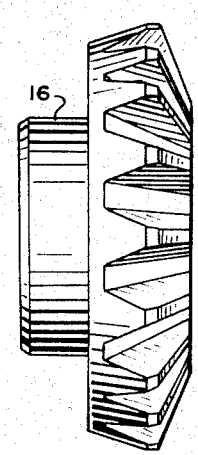
FIG. 2 is a pictorial representation of a conventional side gear of the differential of FIG. 1.

A conventional side gear 16 is shown in FIG. 2. This side gear is modified in such a manner that the displaced silicone putty referred to above will not come out of the side of the gears when meshed but rather move into the next empty space, that is, the space from which the tooth of a differential pinion has come.

Figure 3A:
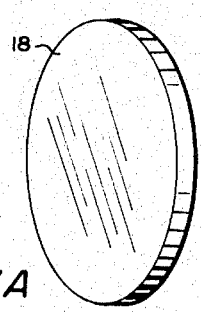
FIGS. 3A and 3B are pictorial representations of the additional parts which are added to the gear of FIG. 2 to make up a pocketed side gear and FIGS. 3C and 3D illustrate an assembled pocketed side gear.
Figure 3B:
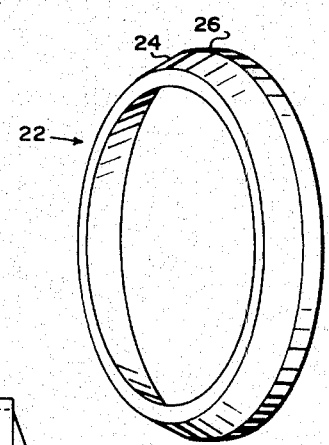
Figure 3C:
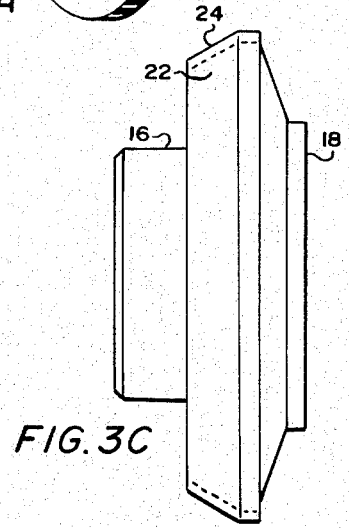
Figure 3D:
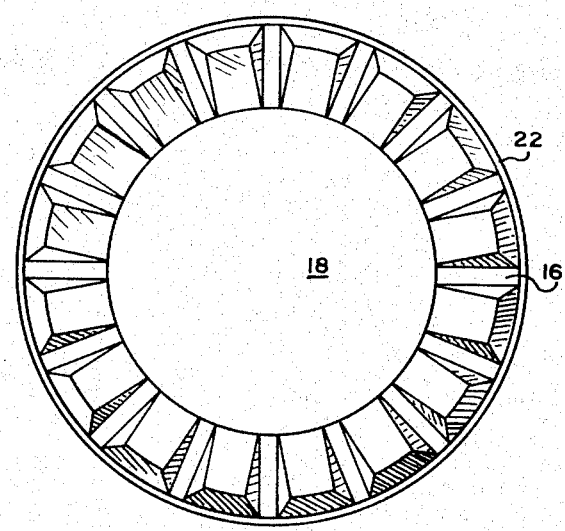

Two parts shown in FIGS. 3A and 3B are added to the gear of FIG. 2 to make up a pocketed gear as shown in FIGS. 3C and 3D. A plate 18 is attached to the toe of gear 16, as, for example, by welding. If a conventional gear is not to be modified but a pocketed gear made initially according to the invention then the plate 18 can be cut from the same piece of material from which the gear is cut such that the plate 18 will be homogenuous with the gear 16. It becomes apparent that fluid cannot be pushed out the toe side of the gear by a tooth of a pinion since the plate 18 covers the exposed portion of the spaces between the teeth of the side gears not meshed with the differential pinion.

A second part, sleeve 22, is attached, as, for example, by welding to the heel of a conventional side gear to prevent fluid escaping from the other side of the gear. This piece has a truncated cone surface 24 expanding into a cylindrical surface 26.

It is thus seen that when fluid between the teeth of the side gears is displaced by a differential pinion entering the space between two teeth, the fluid cannot escape from the sides of the gears and only enter the space from which the tooth of the pinion has left thereby remaining within the meshing gears to resist other teeth of the pinion and providing the requisite action.

Figure 4:
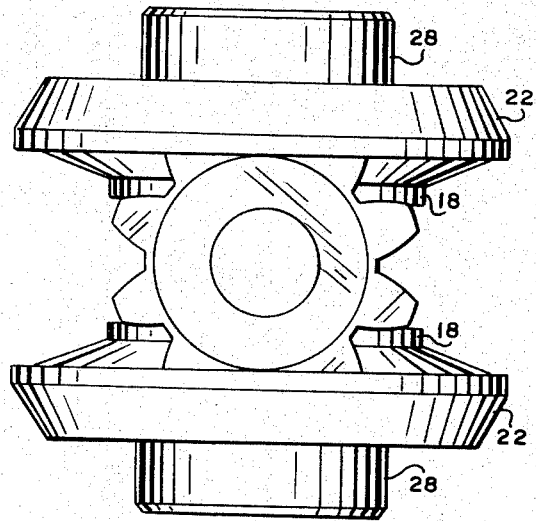
FIG. 4 is a pictorial representation of a portion of a differential gearing using the pocketed side gears of FIGS. 3C and 3D therein.

A portion of the limited slip differential constructed according to the invention is shown in FIG. 4 and comprises a pair of side gears 28 modified as described above with the sleeves 22 and plates 18 which side gears mesh with differential pinions 14, one only being shown for clarity.

It is noted that the differential has none of the drawbacks of the "locking type" differentials and provides significant improvement over that of said U.S. Pat. No. 3,420,120 while not increasing the complexity of the mechanism. Only two gears need be modified and then only to attach rigidly thereto two pieces to each gear. There is no addition of new moving parts and, thus, no decrease in reliability or increase in maintenance required.

The differential of FIG. 4 will permit a vehicle to corner without spinning its inner power wheel, even while accelerating, greatly reducing the danger of erratic turns. Yet should one wheel lose its traction, as on wet or icy pavement, the other will not lose its torque completely as with conventional differentials. On the other hand, it will not give full torque to both wheels, as with the "locking type" differential, but will maintain it in the wheel having traction only in proportion to the RPMs of the spinning wheel. Thereby, the differential described hereinabove reduces the danger of "fishtailing" or "side-slipping" and yet provides traction in difficult road conditions, such as slick, wet icy or snow-covered pavement.

The invention will work with pocketed differential gears, spur gears or helical gears as well as with the pocketed side gears shown and described in detail.

Also, although silicone putty is the preferred fluid, any grease, oil or other lubricant can be employed, and improved slip differential action will take place over conventional differentials.

The closer the tolerance between the teeth of the pinion gears and the pocketed teeth of the side gears, the more resistance will be offered to the pinion teeth in displacing the fluid from the pocket of the side gears.

The invention will vastly improve the performance of 4-wheel drive vehicles, all terrain type vehicles, as well as "industrial off-the-road" vehicles. Popular American-made four-wheel drive vehicles cannot be used on highways while the four-wheel drive is engaged because front and rear axles will not stay synchronized, causing excessive strain on the gear train. Using pocket gear differentials eliminates this problem. A Jeep, for example, would be equipped with three pocketed gear differentials: one in the front axle, one in the rear axle and one in the power transfer case. Thus, a limited slip or continuous self-adjustment would be allowed between not only the right and left wheels, but also the front and rear wheels. A Jeep so equipped can, for example, travel at any speed with four-wheel drive engaged on a paved highway without danger of excessive strain in the power-train components.

Figure 5:
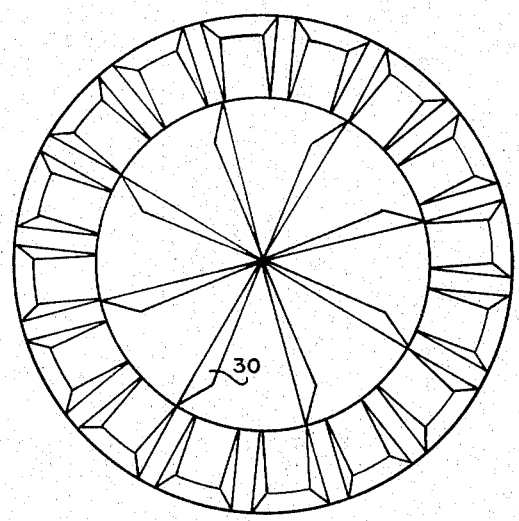
FIG. 5 is a pictorial representation of an alternate embodiment of a side gear.

In an alternate embodiment shown in FIG. 5 conventional side gears are employed being modified with radial fins 30 therein. The fins will offer greater resistance proportionately to the speed of the gears. Torque will be distributed more equally to the axle, even if one or the other wheel encounters less resistance. However, both axles will never completely lock. The radial fins can be used with conventional side gears or with the pocketed gears previously described.

While I have described above the principles of my invention in connection with specific apparatus, it is to be clearly understood that the specification is presented by way of example only and not as a limitation of the scope of this invention as set forth in the accompanying claims.

I claim:

1. In a differential having a sealed fluid containing housing with a pair of side gears and a number of differential pinions therein, wherein the improvement comprises means substantially enclosing the non-meshing portions of the teeth of said side gears forming a rigid pocket such that the fluid entrapped within the meshing gears of the differential cannot readily escape from the sides thereof.

2. In the differential defined in claim 1, said enclosing means including a plate connected to the toe of each of said side gears and extending over a portion of the non-meshing area of the teeth of said gears, and a sleeve connected to the heel of each of said side gears and extending over a portion of the non-meshing area of the teeth of said gears.

3. In the differential of claim 2, said fluid being silicone putty.

4. In the differential of claim 2, said sleeve having a truncated cone surface expanding into a cylindrical surface.

5. In the differential of claim 2, said plate being formed integral with its respective side gear.

6. In the differential of claim 2, further including a number of vanes connected to said plate.

7. In a differential having a sealed fluid containg housing with a pair of side gears and a number of differential pinions therein, wherein the improvement comprises means substantially enclosing the non-meshing portions of the teeth of said differential pinions forming a rigid pocket such that the fluid entrapped within the meshing gears of the differential cannot readily escape from the sides thereof.

8. In the differential defined in claim 7, said enclosing means including a plate connected to the toe of each of said differential pinions and extending over a portion of the non-meshing area of the teeth of said pinions, and a sleeve connected to the heel of each of said pinions and extending over a portion of the non-meshing area of the teeth of said pinions.

9. In the differential of claim 8, said fluid being silicone putty.

10. In the differential of claim 8, said sleeve having a truncated cone surface expanding into a cylindrical surface.

11. In the differential of claim 8, further including a number of vanes connected to said plate.

* * * * *